Patented Apr. 24, 1951

2,550,006

UNITED STATES PATENT OFFICE 2,550,006

METHOD OF LAMINATING FABRICS

Henry Dreyfus, deceased, late of London, England, by Claude Bonard, administrator, London, England, assignor to Celanese Corporation of America, a corporation of Delaware No Drawing. Application November 28, 1945, Serial No. 631,472. In Great Britain December 11, 1944

1 Claim. (Cl. 154—126.5)

This invention relates to composite materials and especially to laminated fabrics, i. e. composite materials comprising a plurality of layers, at least one of which is a layer of textile fabric, bonded together by a thermoplastic film-forming organic polymer, e. g. a derivative of cellulose or synthetic resin. The invention includes the production of the laminated fabrics, as well as of articles made wholly or in part of such fabrics.

A common form of laminated fabric comprises two layers of cotton fabric bonded together by an intermediate layer (the so-called interlining) of fabric containing yarns of cellulose acetate in admixture with yarns of cotton. Laminated fabrics of this construction form the basis of a well-known kind of semi-stiff collar. Such laminated fabrics have hitherto been made by assembling the three layers and pressing the assembly between heated surfaces, for example between the steam-heated plates of a press. To form an effective bond between the layers, it is necessary for the cellulose acetate to become highly plastic or even fluid. To bring the cellulose acetate to the desired condition of plasticity by the aid of heat without causing incipient decomposition of the cellulose acetate accompanied by discolouration and brittleness of the product, it has hitherto been found necessary to carry out the hot pressing while the cellulose acetate is in contact with a volatile solvent; or with a potential solvent, i. e. a volatile liquid which becomes a solvent when heated; or with a plasticiser and water as described in U. S. Patent No. 2,126,755. Even when such auxiliary agents are present it is difficult to avoid some slight discolouration of the outer layers when these are white, and the production of white semi-stiff collars has in consequence presented great difficulty.

Another problem which has presented difficulty is the production of laminated fabrics or laminated fabric articles having outer layers of cellulose acetate or other thermoplastic material without the outer surfaces becoming marred, for example by glazing, during the hot pressing operation.

According to the present invention, in the production of laminated fabrics by bonding together a plurality of layers of material at least one of which is a layer of fabric by means of thermoplastic material comprising a film-forming organic polymer, the bonding is effected under pressure while the thermoplastic material is in a softened condition produced by generating heat within it by means of an alternating electric field of high frequency.

The bonding can be carried out in the entire absence of volatile solvents, potential solvents, or water. When the polymer, like cellulose acetate, does not melt at temperatures below that at which decomposition begins, a plasticiser should be present when strong adhesion between the fabric layers is required, although a degree of adhesion satisfactory for some purposes can be obtained without a plasticiser. In the production of laminated fabrics with outer layers (or an outer layer) of fabric containing unplasticised thermoplastic fibres and an inner layer of plasticised polymer, the process of the invention is superior to prior processes since it does not involve heating the interlining by conduction through the outer layers. Thus, it is not necessary (as it was in prior processes) for the outer layers to reach a temperature as high as that of the interlining. On the contrary, in the preferred form of the invention the pressing members are unheated (except for any heat derived from the layers of material being bonded together) and of metal so that they actually conduct heat away from the outer layers of material. The cooling effect on the outer layers is considerable when the pressing members are of high thermal conductivity, high heat-capacity and have large areas of contact with the said outer layers. Further, hollow, water-cooled pressing members may be used.

The interlining may be a woven fabric containing in both warp and weft, yarns of cellulose acetate and yarns of cotton. The proportion of cellulose acetate to cotton yarns may vary between wide limits, for example from about 30% of cellulose acetate or even less up to 60% or more of cellulose acetate. Instead of the fabric being formed of yarns of cellulose acetate and yarns of cotton, it may be formed of mixed yarns containing staple fibres of cellulose acetate and fibres of cotton; or the warp and/or the weft may be composed of or contain yarns of cellulose acetate doubled with cotton yarns; or the fabric may be composed of or contain cotton yarns lapped with yarns of cellulose acetate. This last arrangement is particularly advantageous as giving a high ratio of cellulose acetate to cotton and providing a fabric having a substantially uninterrupted area of cellulose acetate on both surfaces. Other special methods may be employed to produce interlining fabrics in which a high proportion of cellulose acetate is present on the surface. Thus, for example, an interlining fabric may be so woven from yarns of cellulose acetate and yarns of cotton that the cellulose acetate yarns form floats on both surfaces as described in U. S.

Patent No. 2,158,112. For most purposes it is best to employ a woven fabric as the interlining but for special purposes it may be advantageous to use fabrics of other construction. Thus, for example, with a view to the production of laminated fabric articles having some degree of elasticity a knitted interlining may be used as described in U. S. Application S. No. 481,204 filed March 31, 1943, now Patent No. 2,444,089, corresponding to British Patent No. 557,369. Instead of cotton, other non-thermoplastic fibres may be employed in admixture with the thermoplastic fibres in the interlining. Such non-thermoplastic fibres may be, for example, of linen or regenerated cellulose, especially high-tenacity regenerated cellulose such as is referred to below, in connection with the outer layers.

Although it is preferable for the interlining to be a mixed fabric containing thermoplastic fibres and non-thermoplastic, (the term "fibre" being used to include staple fibres and continuous filaments) this is not essential. Thus, for example, the interlining may be composed solely of cellulose acetate or other thermoplastic fibre-forming cellulose derivative or synthetic resin, plasticised if necessary. Or, the interlining may consist of a film or foil of such thermoplastic material. On the other hand the interlining may be a non-thermoplastic fabric coated with the thermoplastic material.

The outer layers may be composed of woven cotton fabric. Other non-thermoplastic textile fibres may be used in the outer layer in place of cotton or in admixture with cotton. Such textile fibres include linen, silk, wool and regenerated cellulose, especially regenerated cellulose of high tenacity (for example tenacity in excess of 2 or 3 gms. per denier) such as may be made by saponifying cellulose acetate yarn which has been stretched to many times its original length under the influence of steam or hot water. In this way regenerated cellulose yarns of very high tenacity (e. g. 4 to 6 or 8 gms. per denier or even more) may be made. The outer layers may also contain yarns of continuous filaments or staple fibres of cellulose acetate or other thermoplastic textile materials; or these layers may be composed entirely of thermoplastic yarns. The outer fabric layers will in general be woven fabrics but fabrics of other construction, for example knitted fabrics, may be used.

According to a further aspect of the invention, a layer of textile fabric of non-thermoplastic material, or of non-thermoplastic in admixture with thermoplastic material, has bonded, to one or both surfaces, a film or foil of cellulose acetate or other thermoplastic material. The bonding in this case involves heating the outer layers (or in the case of a two-layer assembly, one of the outer layers) to the temperature necessary to give the desired degree of plasticity.

Although the bonding can be carried out in the absence of a plasticiser, the best results have been obtained when the thermoplastic material is plasticised. Among the most suitable plasticisers for cellulose acetate are lower fatty alkyl diesters of phthalic acid, for example dimethyl phthalate and diethyl phthalate; di-alkoxy-alkyl esters of phthalic acid, for example, di-(methoxy-ethyl) phthalate, and di-(ethoxy-ethyl) phthalate; alkyl-phthallyl-alkyl glycollates, for example, methyl-phthallyl-ethyl glycollate, ethyl-phthallyl-ethyl glycollate and butyl-phthallyl-butyl glycollate; and alkyl esters of hydroxy polycarboxylic acids, for example diethyl tartrate, triethyl citrate and acetyl triethyl citrate; and certain phosphoric esters, e. g., tri-phenyl phosphate and tri-(monochlor-ethyl) phosphate. Plasticizers of low or negligible solvent power for cellulose acetate, for example tricresyl phosphate and tributyl phosphate, may also be present, preferably in admixture with a higher proportion of one of the solvent plasticizers referred to above.

Instead of cellulose acetate, other thermoplastic derivatives of cellulose may be employed in the interlining or backing layer and/or in the outer layer or layers of the assembly. The cellulose derivatives that may be so employed include other lower fatty acid esters of cellulose, for example cellulose propionate and cellulose butyrate; mixed esters containing the radicles of acetic acid and of a higher homologue thereof, for example cellulose acetate-propionate, cellulose acetate-butyrate, cellulose acetate-laurate and cellulose acetate-stearate; mixed esters containing an inorganic radicle, for example cellulose acetate-nitrate; simple ethers of cellulose, for example ethyl cellulose, propyl cellulose and benzyl cellulose; mixed ethers of cellulose, for example ethyl hexyl cellulose; and ether-esters of cellulose, for example ethyl cellulose acetate. A film-forming thermoplastic synthetic resin may be used instead of a cellulose derivative; examples of such synthetic resins are polymerised vinyl compounds such as polyvinyl chloride, polyvinyl acetate, polyvinyl-chloride-acetate and polymerised p-dichlor-styrene; polyvinyl acetals such, for example, as can be obtained by partial saponification of polyvinyl acetate followed or accompanied by acetalisation of the saponification product with formaldehyde, acetaldehyde or butyric aldehyde; and polymerised acrylic and alkyl-substituted acrylic acid esters, for example polymerised ethyl acrylate and polymerised methyl methacrylate.

The cellulose derivative or synthetic resin used as bonding material should preferably have a loss factor at frequencies of one megacycle per second of at least 0.05. The process of the invention can be carried out even when the loss factor of the bonding material is less than 0.05, e. g. 0.04 or 0.03, but considerably less economically than in the case of materials of higher loss factor. The invention includes incorporating with the cellulose derivative or synthetic resin a substance adapted to modify the loss-factor of the cellulose derivative or synthetic resin. Thus, for example, the loss factor of a fatty acid ester of cellulose or a cellulose ether may be increased by incorporating therewith a suitable plasticiser. Plasticisers containing chlorine and plasticisers which are esters of phosphoric acid are particularly suitable for this purpose. The plasticiser or other substance adapted to modify the loss factor of the polymer may be applied to the fabric or film which is to be used as the interlining or backing layer in making the products of the invention; or the modifying agent may be incorporated with the polymer at an earlier stage in the production of the interlining or backing material. For instance, it may be incorporated in a dope from which yarns or films for use in the invention are produced. Such methods of increasing the loss factor of the polymer enable polymers of very low loss factor, for example poly-styrene, poly-ethylene and other hydrocarbon polymers, to be used with a suitable modifying agent as the basis of the bonding material of the invention.

In addition to semi-stiff collars, other stiff or semi-stiff articles or apparel can be made by the process of the invention, such articles including cuffs, shirt fronts, belts, sweat bands for hats and straps of braces, suspenders and the like. The most important application of the invention is in the production of three-layer laminated fabrics and laminated fabric articles, but the process of the invention may be employed in the production of two-layer laminated fabrics, and of multi-layer laminated fabrics, composed, for example, of a number of layers of non-thermoplastic fabric alternating with layers of thermoplastic fabric or fabric containing thermoplastic material.

The following examples illustrate the invention:

Example I

A three-layer laminated fabric collar assembly is formed with two outer layers of white woven cotton fabric and an interlining in the form of a white woven fabric, both the warp and the weft of which contain cotton yarns in admixture with cellulose acetate yarns, the cellulose acetate yarns being evenly distributed throughout the fabric and amounting to 30 to 50% of its weight, and the cellulose acetate yarns containing about 30% of dimethyl phthalate based on the weight of cellulose acetate.

The bonding is carried out on a press operated by compressed air and provided with polished metal plates adapted to act as the plates of an electrostatic condenser (the assembly of fabric layers forming the dielectric) in a tunable circuit coupled to an oscillator generating at a frequency of 30 megacycles per second. The lower plate is fixed and earthed, the upper plate is movable and insulated.

The assembly of fabric layers is placed on the lower plate of the press which is then closed, subjecting the assembly to a pressure of about 350 lbs. per square inch. A switch in the primary of the oscillator is then closed and the tunable circuit is tuned to resonance with the output of the oscillator. After two seconds the supply to the oscillator is switched off and after a further half second the press is opened and the laminated fabric collar is removed.

Once the tunable circuit has been tuned for the particular assembly of fabric layers, the timing of the cycle starting with the closing of the press and finishing with the re-opening of the press can be controlled automatically by a controller set in motion by the operator after removing the finished article from the press and replacing it by a fresh assembly.

By this process collars can be produced which are as white as were the outer layers before union and the layers of which are firmly bonded together.

Example II

The process is carried out as in Example I, but using instead of the fabric interlining a perforated foil composed of a co-polymer of 80 to 90 parts of vinyl chloride and 20 to 10 parts of vinyl acetate, plasticised with 25 to 30 parts of dibutyl sebacate and continuing the heating for 3 seconds instead of 2 and the pressing for 3½ seconds instead of 2½. The perforations in the foil provide for the penetration of water vapour and air in the collar.

Example III

The process is carried out as in Example I, but using outer layers of unplasticised cellulose acetate fabric and an interlining of cotton yarns interwoven with cellulose acetate yarns, the ratio of cotton to cellulose acetate being 2:1 by weight, and the cellulose acetate yarns being plasticised with 25 to 35% of their weight of tri-(monochlorethyl)-phosphate. The assembly is bonded together without glazing or incipient fusing of the outer layers of cellulose acetate.

Several assemblies may be placed side by side on the lower plate of the press. Instead of using a press having only a single pair of plates, a multi-plate press may be used, the top plate being insulated and connected to one side of the tunable circuit; the bottom plate being earthed and connected to the other side of said circuit; and the intermediate plates being insulated.

A further method, which is of particular utility when laminated fabric sheets are required, is to build up a stock of sheet assemblies one upon another on the lower plate of a press, both plates of which are connected to one and the same side of the tunable circuit and earthed and to insert in the middle of the pile of assemblies a plate of conducting material polished on both sides, insulated from the press and connected to the other side of said circuit. The heating field is then established between this plate and both plates of the press.

One further method of carrying out the bonding, which is particularly useful in the production of semi-stiff collars and other laminated fabric articles, is to pass the assembly through the nip between two polished rolls of conducting material urged together but prevented from touching one another, the upper, driven roll being insulated and connected to one side of the tunable circuit, the lower, driving, roll being earthed and connected to the other side of said circuit. The assemblies may be continuously fed to the rolls, for example by means of a fabric conveyor belt passing through the rolls. A variant of this method, which has some advantages, is to feed the assembly between a pair of stationary flat electrodes connected respectively to the two sides of the tunable circuit and immediately thereafter, while the thermoplastic material of the inner layer is in the desired state of plasticity, between the nip of a pair of rolls. The feeding may be carried out by passage of the assembly over a train of rolls or through the nip of one or more pairs of rolls and the pressing rolls may be made of or covered with resilient material so as to allow for any differences in thickness over the surface of the assembly, due, for example, to hems.

The invention also includes effecting local bonding between the layers of a laminated fabric assembly, for instance by pressing the assembly between electrodes covering only a part of the area of the assembly so as to localise the heating, or by pressing the assembly over its whole area by means of plates comprising one or more small electrodes separated by insulating material.

Pattern effects may be obtained according to the invention; for example, by pressing an assembly with an outer layer or layers of thermoplastic material between metallic pressing members which are covered over part of their area with heat insulating non-conducting material so that over those parts of their area the usual chilling effect of the pressing member is replaced by a heating effect and the product exhibits local areas of glazing.

According to a modification of the invention, heat hardening polymers of monomers containing more than one unsaturated linkage (for example diallyl phthalate or allyl methacrylate) may also be used. The method and apparatus described may also be used in bonding together fabric layers by means of a thermo-setting synthetic resin (for example phenol-formaldehyde, urea-formaldehyde, thiourea-formaldehyde or melamine-formaldehyde synthetic resin).

Having described the invention, what is desired to secure by Letters Patent is:

Process for making laminated fabrics by bonding together under heat and pressure three layers all having a basis of cellulose acetate, at least one being a fabric, wherein the heating is effected by exposing the assembly to a high frequency alternating electric field, and the intermediate layer only contains tri-(mono-chlor-ethyl) phosphate as a plasticizer, the higher loss factor of said plasticizer causing the intermediate layer to become softened sufficiently to flow under the pressure applied, while the outer layers remain substantially unsoftened.

CLAUDE BONARD.
*Administrator of the Estate of the said Henry Dreyfus, Deceased.*

REFERENCES CITED

The following references are of record in the file of this patent:

UNITED STATES PATENTS

| Number | Name | Date |
|---|---|---|
| 1,806,846 | Fox et al. | May 26, 1931 |
| 2,126,821 | Schneider | Aug. 16, 1938 |
| 2,211,079 | Schneider | Aug. 13, 1940 |
| 2,330,251 | Taylor | Sept. 28, 1943 |
| 2,354,714 | Strickland, Jr. | Aug. 1, 1944 |

FOREIGN PATENTS

| Number | Country | Date |
|---|---|---|
| 555,054 | Great Britain | Aug. 3, 1943 |

OTHER REFERENCES

Hoyler: An Electronic "Sewing Machine"; August 1943—Issue of Electronics (6 pages).